(12) United States Patent
Shim et al.

(10) Patent No.: US 8,076,428 B2
(45) Date of Patent: Dec. 13, 2011

(54) ETHYLENE COPOLYMER HAVING MULTIPLE PITCH MOLECULAR WEIGHT DISTRIBUTION AND THE METHOD OF PREPARING THE SAME

(75) Inventors: Choon Sik Shim, Daejeon (KR); Hyeong Taek Ham, Daejeon (KR); Sung Seok Chae, Daejeon (KR); Dae Ho Shin, Daejeon (KR); Seung Bum Kwon, Daejeon (KR); Jong Sok Hahn, Daejeon (KR); Myung Ahn Ok, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 0 days.

(21) Appl. No.: 12/733,450

(22) PCT Filed: Sep. 2, 2008

(86) PCT No.: PCT/KR2008/005151
§ 371 (c)(1),
(2), (4) Date: Mar. 1, 2010

(87) PCT Pub. No.: WO2009/031798
PCT Pub. Date: Mar. 12, 2009

(65) Prior Publication Data
US 2010/0234545 A1 Sep. 16, 2010

(30) Foreign Application Priority Data
Sep. 5, 2007 (KR) .................. 10-2007-0090079

(51) Int. Cl.
*C08F 4/6592* (2006.01)
*C08F 210/02* (2006.01)

(52) U.S. Cl. .......... 526/65; 526/113; 526/134; 526/160; 526/165; 526/352; 526/943; 524/240

(58) Field of Classification Search .................... 526/65, 526/113, 116, 134, 160, 165, 352, 943; 524/240
See application file for complete search history.

(56) References Cited

U.S. PATENT DOCUMENTS

| | | | |
|---|---|---|---|
| 3,592,880 A | 7/1971 | Diedrich et al. | |
| 4,309,521 A | 1/1982 | Sato et al. | |
| 4,368,291 A | 1/1983 | Frese et al. | |
| 4,368,304 A | 1/1983 | Sato et al. | |
| 4,420,592 A | 12/1983 | Kato et al. | |
| 4,935,474 A | 6/1990 | Ewen et al. | |
| 5,198,401 A | 3/1993 | Turner et al. | |
| 5,648,422 A * | 7/1997 | Collina et al. | 525/52 |
| 5,684,097 A * | 11/1997 | Palmroos et al. | 526/64 |
| 6,277,931 B1 | 8/2001 | Jaber et al. | |
| 6,291,601 B1 * | 9/2001 | Debras | 526/64 |
| 2007/0004586 A1 * | 1/2007 | Woo et al. | 502/117 |

FOREIGN PATENT DOCUMENTS

| | | |
|---|---|---|
| EP | 0040992 | 12/1981 |
| EP | 0057420 | 8/1982 |
| EP | 0237294 | 9/1987 |
| GB | 1505017 | 3/1978 |
| GB | 1532231 | 11/1978 |
| GB | 2020672 | 11/1979 |
| KR | 100328682 | 3/2002 |
| WO | WO9212182 | 7/1992 |
| WO | WO9417112 | 8/1994 |
| WO | WO2006048257 | 5/2006 |

OTHER PUBLICATIONS

Tetsuya Yoshikiyo and Takaaki Hattori, Japan Polyethylene Corp., High performance PE100 Resin with extraordinary resistance to Slow Crack Growth, Plastics Pipes XIII, 2006.

* cited by examiner

*Primary Examiner* — Caixia Lu
(74) *Attorney, Agent, or Firm* — Abelman, Frayne & Schwab

(57) ABSTRACT

Disclosed are an ethylene polymerization process, a catalyst for use in the process, a production method employing the catalyst, and a product produced thereby. More specifically, disclosed is a process of producing an ethylene copolymer from ethylene and an alpha-olefin comonomer, in which the produced ethylene copolymer has a multimodal molecular weight distribution and excellent processability and physical properties, and thus can increase the value and productivity of products, including pipes and films. Particularly, the produced ethylene copolymer has a trimodal or higher molecular weight distribution or density distribution, and thus, when it is a linear low-density copolymer, it has an excellent effect of improving the impact strength of films, and when it is a medium-density ethylene copolymer, it can be produced into pipes, which have slow crack growth rate and can be used even at high temperature.

7 Claims, 2 Drawing Sheets

ETHYLENE COPOLYMER HAVING MULTIPLE PITCH MOLECULAR WEIGHT DISTRIBUTION AND THE METHOD OF PREPARING THE SAME

TECHNICAL FIELD

The present invention relates to a process and catalyst system for producing an ethylene copolymer from ethylene and an alpha-olefin comonomer, and more particularly to a process and catalyst system for producing an ethylene copolymer, which has a multimodal molecular weight distribution and excellent processability and physical properties, and thus can increase the value and productivity of products, including pipes and films.

BACKGROUND ART

In order for ethylene copolymers to have improved physical properties and, at the same time, ensure processability, it is advantageous that the ethylene copolymers have a broader molecular weight distribution and a molecular weight distribution showing two or more peaks in the molecular weight distribution curve.

In attempts to make these ethylene copolymers having improved processability and physical properties, U.S. Pat. No. 4,935,474 discloses a process which uses more than two metallocene catalysts having different reaction rates in one reactor. In this process, a polymer having a relatively broad molecular weight distribution or multimodal molecular weight distribution can be produced, but it is difficult to an ethylene copolymer having various density distributions.

U.S. Pat. No. 3,592,880, European Patent Nos. 057420 and 237294 and GB Patent No. 2020672 disclose slurry-slurry multi-stage polymerization processes, GB Patent No. 1505017, European Patent No. 040992 and U.S. Pat. No. 4,420,592 disclose gas phase-gas phase multi-stage polymerization processes, and GB Patent No. 1532231 and U.S. Pat. Nos. 4,368,291, 4309521 and 4368304 disclose slurry-gas phase multi-stage polymerization processes. Furthermore, PCT International Patent Publication No. WO 9212182 discloses that, in the case of a gas-phase process in a slurry-gas phase process, more than two stages are possible. However, a product produced in said PCT patent shows only a bimodal molecular weight distribution through a two-stage process, this being due to properties of the catalyst and the introduction of hydrogen required due to the catalyst properties, and examples of said patent disclose a process of producing an ethylene copolymer having a limited density of more than 0.930 g/cm$^3$. Thus, the process disclosed in said patent has limitations to producing ethylene copolymer resin for use in various applications, including films having high impact strength.

PCT International Patent No. WO 1994/17112 discloses a process of synthesizing an ethylene copolymer having a broad molecular weight distribution using metallocene and Ziegler-Natta catalysts in a solution polymerization process. However, in said patent, because the ethylene copolymer shows only a bimodal molecular weight distribution, there is a limitation in improving the physical properties of the polymers by improving the process.

U.S. Pat. No. 6,277,931 discloses a process of polymerizing ethylene having a bimodal molecular weight distribution using two kinds of catalysts (metallocene and Ziegler-Natta) in a solution polymerization process.

PCT International Patent Publication No. WO 2006/048257 discloses a process for producing an ethylene copolymer having a broad molecular weight distribution and trimodal molecular weight distribution through three reactors. In said PCT patent, the ethylene copolymer having a trimodal broad molecular weight distribution is produced by partially synthesizing a high-molecular-weight, high-density polyethylene in a prepolymer reactor, which is placed before a slurry process in a slurry-gas phase process, and then subjecting the prepolymer to the slurry-gas phase process. However, there is a shortcoming in that, when the high-molecular-weight moiety of the polymer resin has high density, it adversely affects the impact resistance of films in view of the whole moiety of the resin.

DISCLOSURE

Technical Problem

Accordingly, the present inventors have conducted extensive studies to overcome and solve the above-described problems occurring in the prior art and, as a result, have developed a multistage solution polymerization process employing a suitable catalyst system, in which the properties of an ethylene copolymer, which has a narrow molecular weight distribution and a uniform density distribution and is produced using a single-site catalyst, are controlled through a process of multistage synthesis, such that the processability and physical properties of the ethylene resin can be simultaneously improved. Specifically, the present inventors have developed a multistage solution polymerization process in which ethylene copolymer solutions having different density distributions and a multimodal (preferably trimodal or higher) molecular weight distribution can be produced in the respective reactors using an alpha-olefin comonomer having more than 4 carbon atoms and using different kinds of catalyst systems. Based on this development, the present invention has been completed.

Therefore, it is an object of the present invention to provide a method for producing an ethylene copolymer having a multimodal molecular weight distribution and density distribution so as to satisfy desired physical properties and processability simultaneously.

Another object of the present invention is to provide an ethylene copolymer resin produced using said method.

Technical Solution

To achieve the above objects, the present invention provides a method for producing an ethylene copolymer, comprising the steps of:

(a) polymerizing ethylene with at least one C4-C10 α-olefin in a first reactor using a metallocene catalyst represented by the following formula 1, which comprises aryloxide ligands substituted with a cyclopentadiene derivative around a transition metal and aryl derivatives at the ortho-positions, the ligands not being bridged, thus producing a first copolymer solution;

(b) passing the first copolymer solution through a second reactor, which contains the same metallocene catalyst as used in step (a), ethylene and at least one C4-C10 α-olefin, at a temperature higher than the reaction temperature of step (a), thus producing a second copolymer solution; and (c) passing the second copolymer solution through a third reactor, which contains a Ziegler-Natta catalyst different from the catalyst used in step (b), ethylene and at least one C4-C10 α-olefin, at a temperature higher than the reaction temperature of step (b), thus producing a third copolymer solution:

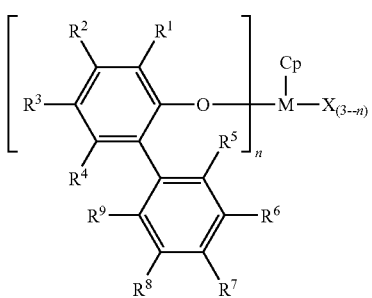

[Formula 1]

wherein M is a group-IV transition metal in the periodic table; Cp is cyclopentadienyl or a derivative thereof, which can form an $\eta^5$-bond with the central metal; $R^1$, $R^2$, $R^3$, $R^4$, $R^5$, $R^6$, $R^7$, $R^8$ and $R^9$ on the aryloxide ligands are each independently a hydrogen atom, a halogen atom, a C1-C20 linear or nonlinear alkyl group optionally substituted with at least one halogen atom, a silyl group containing a C1-C20 linear or nonlinear alkyl group optionally substituted with at least one halogen atom, a C6-C30 aryl group optionally substituted with at least one halogen atom, an C7-C30 arylalkyl group optionally substituted with at least one halogen atom, an alkoxy group having a C1-C20 linear or nonlinear alkyl group optionally substituted with at least one halogen atom, a siloxy group substituted with C3-C20 alkyl or C6-C20 aryl, an amido or phosphido group having a C1-C20 hydrocarbon group, or a mercapto or nitro group substituted with C1-C20 alkyl, wherein these substituents may also optionally bind to each other to form a ring; and X is selected from the group consisting of a halogen atom, a C1-C20 alkyl group other than a Cp derivative, a C7-C30 arylalkyl group, an alkoxy group having a C1-C20 alkyl group, a siloxy group substituted with C3-C20 alkyl, and an amido group having a C1-C20 hydrocarbon group; and n is an integer between 1 and 3.

In another aspect, the present invention provides an ethylene copolymer resin having an ethylene content of more than 60 wt % and a density of 0.900-0.950 g/cm³.

Advantageous Effects

The ethylene copolymer produced using the polymerization process and catalyst system according to the present invention has a multimodal molecular weight distribution and comonomer distribution and excellent processability and physical properties, and thus can increase the performance and value of products, including pipes and films, and can increase the productivity of the products. Particularly, the ethylene copolymer has a trimodal or higher molecular weight distribution or density distribution, and thus, when it is a linear low-density copolymer, it has an excellent effect of improving the impact strength of films, and when it is a medium-density ethylene copolymer, it can be produced into pipes, which have a slow crack growth rate and can be used even at high temperatures.

BEST MODE

Figure 1:
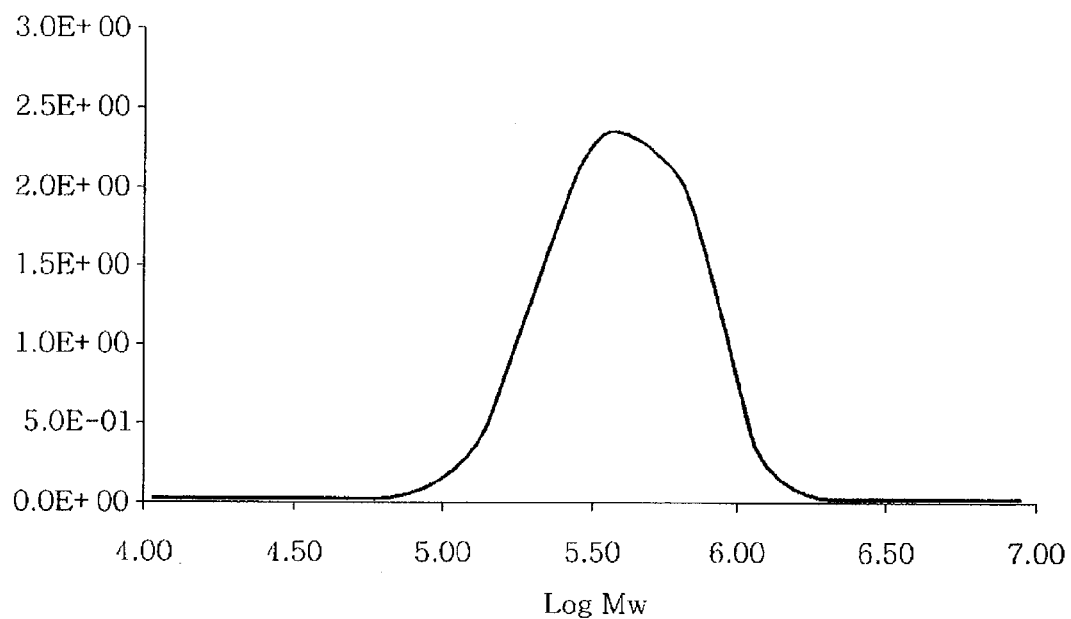
FIG. 1 is a molecular weight distribution curve of an ethylene copolymer produced through first and second reactors in Example 2 of the present invention.
Figure 2:
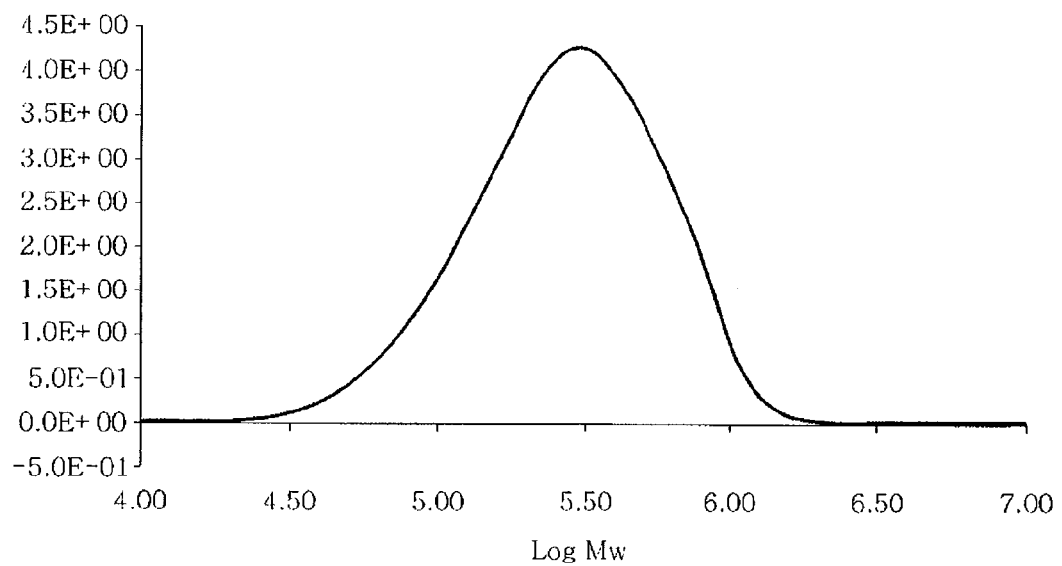
FIG. 2 is a molecular weight distribution curve of an ethylene copolymer produced in Example 2 of the present invention.
Figure 3:
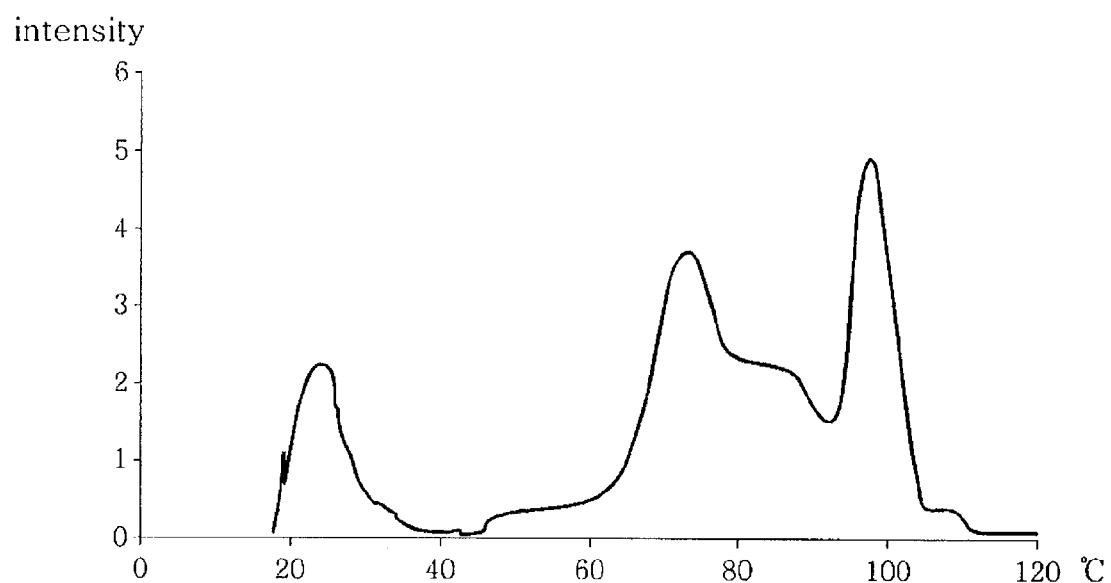
FIG. 3 is a molecular weight distribution curve of an ethylene copolymer produced in Example 1 of the present invention.

Hereinafter, the present invention will be described in detail.

A process for producing an ethylene copolymer according to the present invention requires a single-site catalyst system, which provides a narrow molecular weight distribution and allows high comonomer selectivity and a narrow density distribution to be obtained. This catalyst system comprises: a group-IV transition metal catalyst comprising one or more aryloxide ligands, substituted with a cyclopentadiene derivative and aryl derivatives at the ortho-positions, the ligands not being bridged to each other; and an aluminoxane co-catalyst or a boron compound co-catalyst.

In addition, the catalyst system comprises a compound including at least one transition metal from Groups 3 to 10 of the periodic table. A known Ziegler-Natta catalyst comprising an organometallic compound of Group 1, 2 or 13 of the periodic table is also used in the catalyst system. In the present invention, the density of high-molecular-weight moieties is reduced compared to that of other molecular weight moieties, and the content of tie molecules in the chain is increased, and thus the present invention provides surprising effects of increasing impact strength for film applications and improving long-term durability at high temperature for pipe applications.

1. Description of Catalysts Used in the Present Invention

The Ziegler-Natta catalyst used in the present invention comprises a compound including a transition metal from Groups 3 to 10 of the periodic table as disclosed in U.S. Pat. No. 6,277,931 and comprises an organometallic compound from Groups 1, 2 or 13 of the periodic table, particularly a compound defined by the following formula 2:

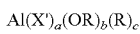 [Formula 2]

wherein X' is a halogen atom, and preferably chlorine, OR is an alkoxy or aryloxy group, and R is a hydrocarbyl group, preferably an alkyl group having 1-10 carbon atoms, and a, b and c are each 0, 1, 2, or 3 with the provisos that a+b+c=3 and b+c=1.

It is preferred that the transition metal compound contain at least one of titanium and vanadium. Exemplary titanium compounds include titanium halides (especially titanium chlorides, of which $TiCl_4$ is preferred); titanium alkyls; titanium alkoxides and "mixed ligand" compounds (i.e., compounds which contain more than one of the above described halide, alkyl and alkoxide ligands). Exemplary vanadium compounds may also contain halide, alkyl or alkoxide ligands. $VOCl_3$ is most preferable.

It is preferred that the Ziegler Natta catalyst used in the present invention contain both titanium and vanadium. The Ti/V mole ratio may be from 1:9 to 9:1, with mole ratios between 5:5 and 2:8 being particularly preferred. The organoaluminum compound shown in formula 2 is an essential component of the Ziegler-Natta catalyst. The mole ratio of aluminum to transition metal is preferably from 1/1 to 100/1, especially from 1.2/1 to 15/1. The transition metal catalyst and the organoaluminum compound may be previously heat-treated at a temperature between 25° C. and 250° C., preferably 80° C. and 200° C., for 10 seconds to 60 minutes, preferably 30 seconds to 5 minutes, before they are introduced into a reactor. An organomagnesium compound represented by the following formula 3 or 4 as disclosed in Korean Patent No. 0328682 may also be used together with the catalyst system. The atomic ratio of magnesium to a mixture of titanium and vanadium is 0.1:1 to 20:1, preferably 0.5:1 to 10:1.

$$MgR^3R^4 \quad \text{[Formula 3]}$$

$$MgR^3R^4)z.AlR^5_3 \quad \text{[Formula 4]}$$

wherein $R^3$, $R^4$ and $R^5$ represent the same or different alkyl or alkoxy groups having 1 to 18 carbon atoms or an aryl group having 6 to 18 carbon atoms.

As shown in the following formula 1, the single-site catalyst system used in the present invention comprises a Group 4 transition metal catalyst comprising aryloxide ligands, substituted with a cyclopentadiene derivative around the transition metal and aryl derivatives at the ortho-positions, the ligands not being bridged to each other:

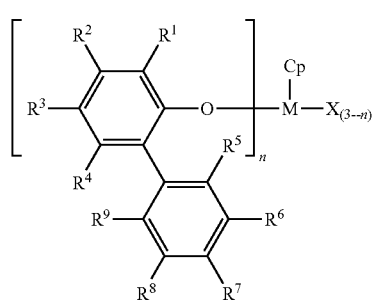

[Formula 1]

wherein M is a group-IV transition metal in the periodic table; Cp is cyclopentadienyl or a derivative thereof, which can form an $\eta^5$-bond with the central metal; $R^1$, $R^2$, $R^3$, $R^4$, $R^5$, $R^6$, $R^7$, $R^8$ and $R^9$ on the aryloxide ligands are each independently a hydrogen atom, a halogen atom, a C1-C20 linear or nonlinear alkyl group optionally substituted with at least one halogen atom, a silyl group containing a C1-C20 linear or nonlinear alkyl group optionally substituted with at least one halogen atom, a C6-C30 aryl group optionally substituted with at least one halogen atom, an C7-C30 arylalkyl group optionally substituted with at least one halogen atom, an alkoxy group having a C1-C20 linear or nonlinear alkyl group optionally substituted with at least one halogen atom, a siloxy group substituted with C3-C20 alkyl or C6-C20 aryl, an amido or phosphido group having a C1-C20 hydrocarbon group, or a mercapto or nitro group substituted with C1-C20 alkyl, wherein these substituents may also optionally bind to each other to form a ring; and X is selected from the group consisting of a halogen atom, a C1-C20 alkyl group other than a Cp derivative, a C7-C30 arylalkyl group, an alkoxy group having a C1-C20 alkyl group, a siloxy group substituted with C3-C20 alkyl, and an amido group having a C1-C20 hydrocarbon group; and n is an integer between 1 and 3.

The single-site catalyst system according to the present invention comprises a bis-arylaryloxy transition metal catalyst comprising two ligands, substituted with a cyclopentadiene derivative around the transition metal and aryl derivatives at the ortho-positions, the ligands not being bridged to each other, as well as an aluminoxane co-catalyst or a boron compound co-catalyst.

Namely, another aspect of the single-site catalyst system according to the present invention relates to a catalyst system comprising said transition metal catalyst and an aluminum or boron compound as a co-catalyst.

In order for the transition metal catalyst of formula 1 to be used as an active catalytic component in the production of a copolymer of ethylene and an α-olefin comonomer, the transition metal catalyst can preferably act with an aluminoxane compound or boron compound as a co-catalyst, which can act as a counterion (i.e., anion) which has a weak bonding force while cationizing the central metal by extracting the ligand X from the transition metal complex.

As the aluminoxane compound in the present invention, a generally well-known aluminoxane represented by the following formula 5 or 6 is mainly used:

$$(-Al(R^{10})-O-)_m \quad \text{[Formula 5]}$$

$$(R^{10})_2Al-(-O(R^{10})-)_p-(R^{10})_2 \quad \text{[Formula 6]}$$

wherein R is a C1-C20 alkyl group, preferably a methyl group or isobutyl group, and m and p are each independently an integer ranging from 5 to 20.

Regarding the blending ratio between the two components for use of the inventive transition metal catalyst as an actual active catalyst, the molar ratio of central metal:aluminum is preferably 1:20 to 1:10,000, and more preferably 1:50 to 1:5,000.

Also, the boron compound that can be used as a co-catalyst in the present invention can be selected from compounds represented by the following formulas 7 to 9, as can be seen in U.S. Pat. No. 5,198,401:

$$B(R^{11})_3 \quad \text{[Formula 7]}$$

$$[R^{12}]^+[B(R^{11})_4]^- \quad \text{[Formula 8]}$$

$$[(R^{13})_qZH]^+[B(R^{11})_4]^- \quad \text{[Formula 9]}$$

wherein B is a boron atom; $R^{11}$ is an unsubstituted phenyl group or a phenyl group substituted with 3-5 substituents selected from among a C1-C4 alkyl group and alkoxy group substituted or unsubstituted with a halogen atom; $R^{12}$ is a cyclic C5-C7 aromatic cation or alkyl-substituted aromatic cation, for example, a triphenylmethyl cation; Z is a nitrogen or phosphorus atom; $R^{13}$ is a C1-C4 alkyl radical or an anilinium radical substituted with two C1-C4 alkyl groups together with a nitrogen atom; and q is an integer of 2 or 3.

In the single-site catalyst system comprising the boron co-catalyst, the molar ratio of central metal:boron atom is preferably 1:0.01 to 1:100, and more preferably 1:0.5 to 1:5.

The transition metal catalyst system according to the present invention may, if necessary, comprise a mixture of said boron compound with an organoaluminum compound or a mixture of said boron compound with said aluminoxane. In this case, the aluminum compound is used to remove a polar compound acting as catalytic poison in a reaction solvent, but may also act as an alkylating agent, if X in the catalyst component is halogen.

The organoaluminum compound is represented by the following formula:

$$(R^{14})_rAl(E)_{3-r} \quad \text{[Formula 10]}$$

wherein $R^{14}$ is an alkyl group having 1 to 8 carbon atoms, E is a hydrogen or halogen atom, and r is an integer ranging from 1 to 3.

Herein, the molar ratio of central metal:boron atom:aluminum atom is preferably 1:0.1-100:10-1,000, and more preferably 1:0.5-5:25-500.

2. Solution Polymerization Process in Multistage Reactors

The solution polymerization process described in the present invention requires at least three polymerization reactors.

The first polymerization reaction is carried out at relatively low temperature and performs polymerization using the above-described single-site metallocene catalyst or catalyst system. The first reactor is operated at a temperature between 70° C. and 150° C., more preferably 80° C. and 130° C., and a pressure of 30-500 atm, and preferably 90-150 atm.

The second reactor contains the above-described single-site metallocene catalyst or catalyst system and is operated at a temperature between 70° C. and 180° C., more preferably 90° C. and 160° C., and a pressure of 30-500 atm, and preferably 90-150 atm.

The third reactor contains the above-described Ziegler-Natta catalyst or catalyst system and is operated at a temperature between 170° C. and 300° C. The reaction pressure in the third reactor may be selected in the range of 30-500 atm, preferably 90-150 atm.

Namely, the present invention aims to control the physical properties of the ethylene copolymer having a uniform molecular weight distribution and density distribution, which can be prepared using the single-site catalyst, by applying the single-site catalyst to the first and second reactors, which differ from each other with respect to process conditions, including temperature and the amount of ethylene supplied. Particularly, in the first reactor, a high-molecular-weight, low-density copolymer is prepared at a suitable ratio in order to improve the physical properties of the resulting resin, including tensile strength and impact strength. In the second reactor, an ethylene copolymer having a molecular weight range and density range different from those in the first reactor is synthesized at a temperature higher than that in the first reactor using the same catalyst as in the first reactor. The product resulting from these processes shows a narrow molecular weight distribution and density distribution due to the properties of the metallocene catalyst, but the ethylene copolymer can be controlled through the two reactors, such that it can have a molecular weight distribution and density distribution desired by a manufacturer. In the third reactor, a copolymer resin satisfying the above-described requirements is prepared using the Ziegler-Natta catalyst, thus providing the effects of improving the processability of the resulting resin and improving the elasticity of films through the control of density of the resin.

A preferred organic solvent which can be used in said preparation method is a C3-C20 hydrocarbon, and specific examples thereof may include butane, isobutane, pentane, hexane, heptane, octane, isooctane, nonane, decane, dodecane, cyclohexane, methylcyclohexane, benzene, toluene, xylene and the like.

In the preparation of a copolymer of ethylene with α-olefin, α-olefin having 3 to 18 carbon atoms can be used as a comonomer together with ethylene, and can preferably be selected from the group consisting of propylene, 1-butene, 1-pentene, 4-methyl-1-pentene, 1-hexene, 1-octene, 1-decene, 1-dodecene, 1-hexadecene, and 1-octadecene. More preferably, ethylene can be copolymerized with 1-butene, 1-hexene, 1-octene or 1-decene.

Ethylene is polymerized with the comonomer according to the conditions of each of the reactors, and the ratio between the amounts of ethylene supplied into the first, second and third reactors is 1-1.6:3-5.2:3.2-6, assuming that the total amount of ethylene supplied into the three reactors is 10.

The ethylene copolymer prepared according to the method of the present invention generally has an ethylene content of more than 60 wt %, and preferably more than 75 wt %. Linear low-density polyethylene (LLDPE) prepared using the C4-C10 α-olefin as a comonomer as described above has a density ranging from 0.910 g/cc to 0.940 g/cc, and the inventive method can also be applied for the production of very low-density or ultra-low-density polyethylene (VLDPE or ULDPE) having a density of less than 0.910 g/cc.

The fractional ranges and physical properties of a polymer, which is synthesized in each of the reactors in order to obtain a multimodal molecular weight distribution ethylene copolymer having improved processability and properties as described above, are as follows.

The polymer fraction that is produced in the first reactor accounts for 2-20 wt %, and preferably 5-15 wt %, based on the total weight of the polymer fractions that are produced in the three reactors. If the polymer fraction that is produced in the first reactor is less than 2 wt %, there is little or no effect on the improvement in impact strength, and if it exceeds 20 wt %, the resulting resin shows a remarkable decrease in the transparency when it is processed into films, and it requires high energy in the process of processing it into films, leading to a reduction in productivity. Regarding the molecular weight of the polymer fraction that is produced in the first reactor, it has a melt index (MI) of 0.001-1.0 g/10 min, and preferably 0.005-0.5 g/10 min, as measured in accordance with ASTM D2839. If the melt index (MI) is more than 1.0 g/10 min, a distinct improvement in physical properties, including tensile strength and impact strength is not shown, and Tetsuya Yoshikiyo and Takaaki Hattori ('High Performance PE100 Resin with Extraordinary Resistance to Slow Crack Growth' Plastics Pipes XIII Conference, 2007) teach that, in a multistage polymerization process for producing an ethylene copolymer having a multimodal molecular weight distribution, higher-molecular-weight moieties should be polymerized in earlier steps in order to facilitate the dispersion of the higher-molecular-weight moieties throughout the entire polymer resin. For this reason, the MI of the polymer fraction that is produced in the first reactor is limited to less than 1.0 g/10 min. Also, the density of the polymer fraction that is produced in the first reactor is determined in the range of 0.860-0.920 g/cm$^3$, and preferably 0.880-0.910 g/cm$^3$.

As described above, the low-density resin is synthesized in either the first reactor or the first and second reactors, and this synthesis procedure in the first reactor is carried out in order to synthesize a resin having a uniform comonomer distribution in the polymer chain using a single-site catalyst other than a Ziegler-Natta catalyst showing a non-uniform comonomer distribution in the polymer chain, thus improving the physical properties of the resulting resin.

The polymer fraction that is produced in the second reactor accounts for 5-15 wt %, and preferably 15-65 wt %, based on the total weight of the polymer fractions which are produced in the first, second and third reactors. If the polymer fraction that is produced in the second reactor is less than 5 wt %, the processability of the resulting resin and the transparency of films made using the resin are reduced due to the high-molecular-weight, low-density ethylene copolymer produced in the first reactor. On the other hand, if it exceeds 78 wt %, the fraction of the polymer produced in the third reactor is reduced, such that energy consumption in processing the copolymer is increased and the resulting resin has reduced elasticity and cannot show other improved physical properties. Regarding the molecular weight of the polymer fraction that is produced in the second reactor, the polymer fraction that is produced in the second reactor has a melt index (MI) of 0.1-10.0 g/10 min, preferably 0.3-5.0 g/10 min, as measured in accordance with ASTM D2839. If the melt index (MI) is less than 0.1 g/10 min, the molecular weight range of the polymer produced in the second reactor overlaps with that of the polymer produced in the first reactor, such that the advantage of the three-stage reaction is not obtained, and if the melt index exceeds 10 g/min, the physical properties of the resulting resin are deteriorated due to low molecular weight. Moreover, the density of the polymer fraction that is produced in the second reactor is determined in the range of 0.900-0.940 g/cm$^3$. The density ranges of the copolymer, which is produced in the first reactor, and the copolymer which is produced in the second reactor, are adjusted to density ranges in which the physical properties of the resulting resin can be optimized. If the density of the copolymer fraction that is produced in the second reactor is less than 0.900 g/cm$^3$, it is similar to the density range of the copolymer that is produced in the first reactor, such that the effect of the three-stage reaction is not obtained, and if it is more than 0.940 g/cm$^3$, the resulting resin becomes excessively stiff, when it is used for applications, including films.

The ethylene copolymer passed through the first and second reactors has a molecular weight distribution index of more than 3. If the molecular weight distribution index of the ethylene copolymer passed through the first and second reactors is less than 3, it is not greatly different from the case in which a single reactor and a metallocene catalyst are used, and the effect of controlling density and molecular weight distribution is not obtained, thus reducing the effect of improving processability and physical properties.

The polymer fraction that is produced in the third or higher-stage reactor accounts for 20-75 wt %, and preferably 30-70 wt %, based on the total weight of polymer fractions produced. If the polymer fraction that is produced in the third reactor is less than 20 wt %, it has no effect on the improvement in processability, and if it exceeds 75 wt %, it leads to deterioration in physical properties, including impact strength, environmental resistance and heat seal properties.

If a polymer is synthesized through a multistage (more than two stages) reaction system, the physical properties of a polymer fraction which is synthesized in the second, third or higher-stage reactor can be measured by collecting and analyzing resin for each of the reactor stages, such as after the first reactor or after the second reactor, and analyzing the finally produced polymer, thus measuring the physical properties (density and molecular weight) of the polymer fraction produced in each of the stages. Specifically, the physical properties can be measured either by analyzing the physical properties of a polymer, which is produced in a single reactor corresponding to each of the reactors under the same polymerization conditions, including reaction temperature, pressure, solvent, reactants, catalysts and reaction time, as used in each of the reactors, or by analyzing a fraction corresponding to each stage according to the method described in the literature (B. Hagstroem, Conference on Polymer Processing, 1997). Therefore, the physical properties of a polymer fraction, which is produced in each stage of the multistage reaction process, can be analyzed using the above-described methods, even though it is difficult to directly measure the physical properties.

The monomer or comonomer is subjected to a process of dissolving it in a solvent, before it is fed into the reactors. Before the mixing and dissolution process, the monomer, comonomer and solvent are subjected to a purification process to remove water, oxygen, carbon monoxide and other metal impurities, which can potentially act as catalytic poisons. As is known in the art, a molecular sieve, activated aluminum, or silica gel is used in the purification process.

Before raw materials are fed into the reactors, they are heated or cooled through a heat exchange process so as to control the internal temperature of the reactors. Specifically, controlling the temperature of the reactors is an adiabatic process in which no heat exchange through the reactor wall occurs, and the control of reaction heat changes the temperature of the solvent and monomer flows into the reactors and controls the internal temperature of the reactors. In the method of the present invention, ethylene, a comonomer, a catalyst, a solvent and the like may additionally be fed into the second or higher-stage reactor and are also controlled to suitable temperatures through a heat exchange process. Generally, the catalytic components are fed into the reactors independently from other components. Herein, the catalytic components are previously mixed with or dissolved in a solvent before being fed into the reactors.

The residence time in each of the reactors is determined by the designed volume and hourly productivity of each of the reactors. Materials in each of the reactors become almost uniform through suitable stirring, such that they can be maintained at constant operating conditions. The polymer or copolymer finally produced in the reaction system is recovered through a suitable solvent removal process.

MODE FOR INVENTION

Hereinafter, the present invention will be described in detail with reference to examples. It is to be understood, however, that these examples are not to be construed to limit the scope of the present invention.

Ethylene polymers produced in examples of the present invention were analyzed in the following manner.

1. Melt index (MI)

This was measured in accordance with ASTM D 2839.

2. Density

This was measured using a density gradient column in accordance with ASTM D 1505.

3. Analysis of melting point (Tm)

Melting point was measured using Dupont DSC2910 at a heating rate of 10° C./min in a nitrogen atmosphere.

4. Molecular weight and molecular weight distribution

Measurement was conducted using PL210 GPC equipped with PL mixed-BX2+preCol at 135° C. at a rate of 1.0 ml/min in the presence of a 1,2,3-trichlorobenzene solvent. A PL polystyrene standard was used to calibrate molecular weight.

5. Tensile strength

This was measured in accordance with ASTM D638.

6. Impact strength

This was measured in accordance with ASTM D1709.

7. Haze

This was measured in accordance with ASTM D1003.

8. Heat seal

An ethylene copolymer produced in each of Examples and Comparative Examples was processed into a film, and two sheets of the film were put on each other and adhered to each other at a temperature for 1 sec at a pressure of 2 kg$_f$/cm$^2$. The tensile strength of the adhered sample was measured in accordance with ASTM D638, and when it exceeded 1,500 g, the temperature at that time was recorded as a heat seal value. Specifically, it can be seen that, as the heat seal value becomes lower, energy consumption becomes lower, and the resin shows strength when it is used after adhesion.

9. Processing load

While the product was processed using an extruder having a diameter of 35 mm, a current value applied to the extruder motor was measured as a processing load.

10. Measurement of physical properties of pipes

In order to evaluate the suitability and advantage of the produced resin for pipe applications, the resin was processed into a pipe (outer diameter=16 mm, and thickness=1.45 mm), and the slow crack growth resistance thereof of the pipe was measured in accordance with ISO 13479.

All tests related to examples were carried out using a continuous solution polymerization process as mentioned below. In this process, all flows, including solvent, monomer and catalyst flows, were continuously fed, a reaction product was separated into a polymer, the solvent and unreacted material, and the separated solvent and unreacted material were also continuously removed. All the fed flows were passed through conventionally known adsorption media to increase purity, before they were fed into the reactor, and in this process, catalyst poisoning impurities (water, oxygen, carbon monoxide, etc.) were removed. All the raw materials were also stored in a high-purity nitrogen atmosphere before use.

The polymerization process of the present invention consisted of three reactors, which were continuously connected with each other. The first reactor had an internal volume of 100 ml and was continuously connected with the second and third reactors having volumes of 250 ml and 350 ml, respectively, through pipes. Each of the reactors was designed such that it could be fed with a solvent, a monomer, a comonomer and a catalyst. The catalyst fed into the first reactor was the single-site catalyst system of formula 1, which was applied commonly in the first and second reactors.

As co-catalysts, a boron-containing ionic activating agent and alumoxane were used. Specifically, in Examples of the present invention, triisobutyl aluminum was used as alumoxane, and triphenylmethylinium tetrakispentafluorophenylborate was selectively used as the ionic activator. The catalyst and co-catalyst were dissolved in toluene, before they were fed into the first and second reactors.

A catalyst applied in the third reactor was a Ziegler-Natta catalyst, in which titanium and vanadium in the form of $TiCl_4$ and $VOCl_3$ are mixed with each other at a given ratio (a mass ratio of 1:1 in Examples).

In the practice of the present invention, the main polymerization catalyst was heat-treated, before it was mixed with the polymerization co-catalyst or fed into the polymerization reactors. This heat treatment process was performed by mixing the Ziegler-Natta catalyst components with each other at a temperature lower than 50° C., and then heating the mixed catalyst components at a temperature of 25-250° C., and preferably 80-200° C., for from 10 seconds to 60 minutes, and preferably from 30 seconds to 5 minutes. Through this heat treatment process, the binding state between the metal components and the particle structure and size of the catalyst were suitably changed, leading to an increase in the polymerization activity of the catalyst.

The polymerization process was carried out at a pressure of 110 kg/cm$^2$ using cyclohexane as a solvent. Ethylene was dissolved in cyclohexane at a pressure of 30 kg/cm$^2$ and a temperature of 23° C., before it was fed into the polymerization reactors. The comonomer was also dissolved in a solvent, before it was fed into the polymerization reactors. As the polymerization reaction progressed, the conversion rate of ethylene was adjusted by catalyst concentration, reaction temperature, catalyst activity and the like.

PREPARATION OF SINGLE-SITE CATALYSTS

Preparation Example 1

Synthesis of bis(pentamethylcyclopentadienyl)(2-phenyl-4-fluorophenoxy)titanium (IV) chloride 1.90 g (10.09 mmol) of 2-phenyl-4-fluorophenol was dissolved in 80 ml of diethylether, and 4.8 ml of butyl lithium (2.5 M hexane solution) was slowly added dropwise thereto at 0° C. The mixture was allowed to react at room temperature for 5 hours, and then a solution of trichloro(pentamethylcyclopentadienyl)titanium (IV) (1.64 g, 5.5 mmol) in 10 ml of diethyl ether was slowly added dropwise thereto at −78° C. The reaction product was stirred at room temperature for 12 hours and filtered, and then volatile materials were removed therefrom. The residue was recrystallized from a mixed solvent of toluene/hexane at −35° C., thus obtaining 2.54 g of a orange-colored solid.

Yield: 85%.

1H NMR (C6D6): 1.46 (s, 15H), 6.65-7.57 (m, 8H).

Preparation Example 2

Synthesis of bis(4-methyl-2-(2'-isopropylphenyl)phenoxy)(pentamethylcyclopentadienyl)titanium (IV) chloride 2 g (8.8 mmol) of 4-methyl-2-(2'-isopropylphenyl)phenol and 636 mg (26.5 mmol) of sodium hydride were dissolved in 20 ml of toluene, and then refluxed for 4 hours. The refluxed solution was cooled to room temperature, and then a solution of 1.15 g (4.0 mmol) of (pentamethylcyclopentadienyl) titanium (IV) trichloride in 5 ml of toluene was slowly added dropwise thereto, and the mixture solution was refluxed for 24 hours. After completion of the reaction, volatile materials were removed therefrom, and the residue was washed with purified hexane, and then recrystallized from hexane at −35° C. The resulting material was filtered and then dried in a vacuum, thus obtaining 1.65 g of an orange-colored solid.

Yield: 61%.

1H NMR (C6D6): δ=0.96-1.07 (m, 6H), 1.54 (s, 15H), 1.72 (s, 3H), 2.76 (m, 1H), 6.76-7.27 (m, 7H) ppm Preparation Example 3

Synthesis of bis(2-phenylphenoxy)(pentamethylcyclopentadienyl)titanium (IV) chloride 1.72 g (10.1 mmol, 99%) of 2-phenylphenol (Aldrich) was placed in a dried flask and dissolved in 40 ml of toluene, and then the solution was cooled to 0° C. with constant stirring. 4.8 ml of N-butyl lithium (2.5 M hexane solution, Aldrich) was slowly added dropwise to the mixture. After completion of the dropwise addition, the mixture was left to stand for 1 hour, and then a solution of 1.64 g (5.5 mmol) of pentamethylcyclopentadienyl titanium trichloride in 10 ml of toluene was slowly added dropwise thereto. After completion of the dropwise addition, the mixture was left to stand for 1 hour, and then warmed to room temperature and stirred again for 1 hour. After the temperature of the reactor was increased to 90° C., the mixture was allowed to react for 12 hours. The reaction product was filtered, and then volatile materials were removed therefrom. The residue was recrystallized from a mixed solvent of toluene/hexane at −35° C., thus obtaining 2.3 g of an orange-colored solid.

Yield: 75%.

1H NMR (C6D6): δ=1.54 (s, 15H), 6.74-7.16 (m, 9H) ppm

Preparation Example 4

Synthesis of 2-isopropyl-6-phenylphenol 1.98 g (8.64 mmol) of 2-bromo-6-isopropylanisol, 2.10 g (17.28 mmol) of phenylboronic acid, 96 mg (0.43 mmol) of palladium acetate, 0.225 g (0.86 mmol) of triphenylphosphine and 11 g (51.84 mmol) of potassium phosphate were placed in a flask, and a mixed solution of 8 ml of water and 32 ml of dimethoxyethane was added thereto. The mixture was refluxed at room temperature for 12 hours. After the refluxed solution was cooled to room temperature, 15 ml of an aqueous ammonium chloride solution and 30 ml of diethyl ether were added thereto. Then, the organic layer was separated and the residue was extracted with diethyl ether. The collected organic layer was dried over magnesium sulfate, and volatile materials were removed therefrom, thus obtaining 2 g of 2-isopropyl-6-phenylanisol as a gray solid. The obtained anisol was dissolved in 15 ml of methylene chloride without a separate purification process, and then 12 ml of boron tribromide (1M methylene chloride) was added dropwise thereto at −78° C., and the mixture was warmed slowly to room temperature and allowed to react for 12 hours. After completion of the reaction, a mixed solution of 15 ml of water and 30 ml of diethyl ether was added thereto. The organic layer was separated and the aqueous layer was extracted with diethyl ether (15 ml×3). The collected organic layer was dried, and volatile components were removed in a vacuum. The residue was purified using a silica gel chromatography column in a mixed solvent of hexane and methylene chloride, thus obtaining 1.72 g of 2-isopropyl-6-phenylphenol as a white solid.

Yield: 94%.

1H-NMR (CDCl$_3$): δ=1.307 (d, 6H), 3.45 (m, 1H), 5.09 (s, 1H), 6.95-7.43 (m, 8H) ppm Synthesis of (dichloro)(pentamethylcyclopentadienyl)(2-isopropyl-6-phenylphenoxy)titanium (IV)

700 mg (3.28 mmol) of 2-isopropyl-6-phenylphenol and 236 mg (9.84 mmol) of sodium hydride were dissolved in 10 ml of toluene, and then refluxed for 4 hours. The refluxed solution was cooled to room temperature, and then a solution of 930 mg (3.21 mmol) of trichloro(pentamethylcyclopentadienyl)titanium (IV) was slowly added dropwise thereto, and the mixture was refluxed for 24 hours. After completion of the reflux reaction, volatile components were removed from the reaction solution, and the residue was washed with purified hexane, recrystallized from a mixed solvent of toluene/hexane −35° C., filtered, and then dried in a vacuum, thus obtaining 1.0 g of a red solid.

Yield: 64%.

1H-NMR (C6D6): δ=1.324 (d, 6H), 1.63 (s, 15H), 3.53 (m, 1H), 7.05-7.66 (m, 8H) ppm

EXAMPLE 1

As a single-site metallocene catalyst in the first and second reactors, bis(pentamethylcyclopentadienyl)(2-phenyl-4-fluorophenoxy)titanium chloride synthesized in Preparation Example 1 was used and as a catalyst in the third reactor, the above-described Ziegler-Natta catalyst was used. The amounts of catalysts used in Examples and Comparative Examples are shown in Tables 1 to 3, wherein Ti indicates a single-site catalyst, Al indicates triisobutylaluminum as a co-catalyst, and B indicates triphenylmethylinium tetrakispentafluorophenylborate. The catalysts were dissolved in toluene at concentrations of 0.5 mol/ml, 10 mol/ml and 5 mol/ml, respectively, before they were fed into the reactors. The ratio of the amounts of ethylene fed into the first, second and third reactors was 1:3:6, and 1-octene was used as a comonomer. However, the amount of ethylene fed into the second reactor was determined in consideration of unreacted ethylene passed to the second reactor, when the conversion of ethylene in the first reactor was low in order to adjust the density and molecular weight of the polymer in the first reactor. The conversion rate in each of the reactors could be anticipated through the reaction conditions and temperature gradient conditions used to produce a polymer in each of the reactors. Also, in the case of the single-site catalyst, the molecular weight of the polymer in each of the reactors was controlled as a function of the reactor temperature and the 1-octene content, and the reaction conditions are shown in Tables 1 and 2 below. In addition, in the case of the Ziegler-Natta catalyst, the molecular weight of the polymer was capable of being controlled mainly by the content of hydrogen fed into the reactors.

EXAMPLE 2

A polymer was produced in the same manner as in Example 1, except that bis(2-phenylphenoxy)(pentamethylcyclopentadienyl)titanium(IV) chloride synthesized in Preparation Example 3 was used as the single-site catalyst, was dissolved in toluene at a concentration of 0.5 mol/ml and was added in the amounts shown in Tables 1 and 2. Also, the amount of ethylene fed into each reactor, the amount of the comonomer 1-octene, and the reactor temperature conditions, were changed as shown in Tables 1 and 2.

EXAMPLE 3

A polymer was produced in the same manner as in Example 1, except that, as the single-site catalyst, bis(4-methyl-2-(2'-isopropylphenyl)phenoxy)(pentamethylcyclopentadienyl)titanium chloride synthesized in Preparation Example 2 was dissolved in toluene at a concentration of 0.5 mol/ml and was fed in the amounts shown in Tables 1 and 2. Also, the amount of ethylene fed into each reactor, the amount of the comonomer 1-octene, and the reactor temperature conditions, were changed as shown in Tables 1 and 2.

EXAMPLE 4

A polymer was produced in the same manner as in Example 1, except that, as the single-site catalyst, bis(2-phenylphenoxy)(pentamethylcyclopentadienyl)titanium(IV) chloride synthesized in Preparation Example 3 was dissolved in toluene at a concentration of 0.5 mol/ml and was fed in the amounts shown in Tables 1 and 2. Also, the amount of ethylene fed into each reactor, the amount of the comonomer 1-octene, and the reactor temperature conditions, were changed as shown in Tables 1 and 2. Meanwhile, as the co-catalyst in the Ziegler-Natta catalyst fed into the third reactor, the above-mentioned butylethylmagnesium compound disclosed in Korean Patent Registration No. 0328682 was dissolved in cyclohexane at a concentration and fed into the third reactor, and the detailed conditions thereof are shown in Tables 1 and 2.

EXAMPLE 5

A polymer was produced in the same manner as in Example 4, except that the amounts of the single-site catalyst fed into the first and second reactors were changed as shown in Tables 1 and 2 and that the amount of ethylene fed into each reactor, the amount of the comonomer 1-octene, and the reactor temperature conditions, were changed as shown in Tables 1 and 2. Meanwhile, as the co-catalyst in the Ziegler-Natta catalyst fed into the third reactor, the above-mentioned butylethylmagnesium compound disclosed in Korean Patent Registration No. 0328682 was dissolved in cyclohexane at a concentration and fed into the third reactor, and the detailed conditions thereof are shown in Tables 1 and 2.

EXAMPLE 6

A polymer was prepared in the same manner as in Example 1, except that, as the single-site catalyst, (dichloro)(pentamethylcyclopentadienyl)(2-isopropyl-6-phenylphenoxy)titanium(IV) was dissolved in toluene at a concentration of 0.5 mol/ml and was fed into the first and second reactors in the amounts shown in Tables 1 and 2. Also, the amount of ethylene fed into each reactor, the amount of the comonomer 1-octene, and the reactor temperature conditions, were changed as shown in Tables 1 and 2.

COMPARATIVE EXAMPLES

Comparative Example 1

As reactors, only the second and third reactors were used. In the second reactor, the same single-site catalyst as in Example 1 was used, and in the third reactor, the same Ziegler-Natta catalyst as in Example 1 was used. The amounts of ethylene and 1-octene fed into each of the reactors are shown in Table 3 below, and the conditions in each reactor are also shown in Table 3.

Comparative Example 2

As reactors, only the second and third reactors were used. In the second reactor, the same single-site catalyst as in Example 2 was used, and in the third reactor, the same Ziegler-Natta catalyst as in Example 2 was used. The amounts of ethylene and 1-octene fed into each of the reactors are shown in Table 3 below, and the conditions in each reactor are also shown in Table 3.

Comparative Example 3

As reactors, only the second and third reactors were used. In the second reactor, the same single-site catalyst as in Example 5 was used, and in the third reactor, the same Ziegler-Natta catalyst as in Example 5 was used. The amounts of ethylene and 1-octene fed into each of the reactors are shown in Table 3 below, and the conditions in each reactor are also shown in Table 3.

Comparative Example 4

A polymer was produced in the same manner as in Example 1, except that the single-site catalyst used in the first and second reactors was (triphenyl)(pentamethylcyclopentadienyl)titanium (IV) was dissolved in toluene at a concentration of 0.5 mol/ml and was fed in the amounts shown in Table 3. Also, the amounts of ethylene and comonomer 1-octene fed into each of the reactors, and reactor temperature conditions, were changed as shown in Table 3.

Comparative Example 5

A polymer was produced in the same manner as in Example 3, except that the single-site catalyst used in the first and second reactors was (dichloro)(pentamethylcyclopentadienyl)(2,6-di-tert-butylphenoxy)titanium(IV), and it was dissolved in toluene at a concentration of 0.5 mol/ml and was fed into the reactors in the amounts shown in Table 3. Also, the amounts of ethylene and comonomer 1-octene fed into each of the reactors, and reactor temperature conditions, were changed as shown in Table 3.

TABLE 1

|  |  | Example 1 | Example 2 | Example 3 |
|---|---|---|---|---|
| Total solution flow rate (kg/h) |  | 6.5 | 6.5 | 6.5 |
| Ethylene feed ratio |  | 1:3:6 | 1.5:3:5.5 | 1:4:5 |
| Feed ratio between 1-octene and ethylene | Reactor 1 | 0.85 | 1.15 | 0.47 |
|  | Reactor 2 | 0.30 | 0.25 | 0.28 |
|  | Reactor 3 | 0.12 | 0.1 | 0.12 |
| Ti feed (μmol/kg) | Reactor 1 | 5.0 | 3.1 | 2.9 |
|  | Reactor 2 | 8.5 | 7.9 | 8.0 |
| Al/Ti ratio | Reactors 1 and 2 | 80 | 80 | 80 |
| B/Ti ratio | Reactors 1 and 2 | 3 | 3 | 3 |
| Ti + V feed (ppm) | Reactor 3 | 28 | 25 | 24 |
| Al/(Ti + V) ratio | Reactor 3 | 4.6 | 4.6 | 4.6 |
| Mg/(Ti + V) ratio | Reactor 3 | — | — | — |
| Reaction temperature | Reactor 1 | 128 | 105 | 105 |
|  | Reactor 2 | 153 | 144 | 139 |
|  | Reactor 3 | 237 | 235 | 230 |
| Sample after reactor 1 | MI | 0.11 | 0.10 | 0.08 |
|  | Density | 0.875 | 0.868 | 0.889 |
| Sample after reactor 2 | MI | 0.56 | 0.46 | 0.35 |
|  | Density | 0.894 | 0.893 | 0.899 |
| GPC of sample after reactor 2 | Number-average molecular weight | 42500 | 45600 | 47800 |
|  | Weight-average molecular weight | 132500 | 138100 | 145700 |
|  | Molecular weight distribution index | 3.12 | 3.03 | 3.05 |
| Final resin sample | MI | 2.49 | 2.37 | 1.06 |
|  | Density | 0.919 | 0.919 | 0.916 |

TABLE 1-continued

|  |  | Example 1 | Example 2 | Example 3 |
|---|---|---|---|---|
| GPC of final resin samlple | Number-average molecular weight | 24060 | 24200 | 26790 |
|  | Weight-average molecular weight | 91670 | 94700 | 108500 |
|  | Molecular weight distribution index | 3.80 | 3.92 | 4.05 |

TABLE 2

|  |  | Example 4 | Example 5 | Example 6 |
|---|---|---|---|---|
| Total solution flow rate (kg/h) |  | 6.5 | 6.5 | 6.5 |
| Ethylene feed ratio |  | 1.2:4:4.8 | 1.6:5.2:3.2 | 1:3.5:5.5 |
| Feed ratio between 1-octene and ethylene | Reactor 1 | 0.40 | 0.44 | 0.20 |
|  | Reactor 2 | 0.28 | 0.22 | 0.09 |
|  | Reactor 3 | 0.11 | 0.03 | 0.03 |
| Ti feed ($\mu$mol/kg) | Reactor 1 | 1.7 | 2.6 | 2.5 |
|  | Reactor 2 | 8.0 | 8.0 | 6.7 |
| Al/Ti ratio | Reactors 1 and 2 | 80 | 80 | 80 |
| B/Ti ratio | Reactors 1 and 2 | 3 | 3 | 3 |
| Ti + V feed (ppm) | Reactor 3 | 14 | 16 | 25 |
| Al/(Ti + V) ratio | Reactor 3 | — | — | — |
| Mg/(Ti + V) ratio | Reactor 3 | 4.52 | 4.52 | — |
| Reaction temperature | Reactor 1 | 98 | 106 | 107 |
|  | Reactor 2 | 148 | 151 | 142 |
|  | Reactor 3 | 232 | 235 | 231 |
| Sample after reactor 1 | MI | 0.01 | 0.05 | 0.01 |
|  | Density | 0.885 | 0.891 | 0.910 |
| Sample after reactor 2 | MI | 0.22 | 0.38 | 0.21 |
|  | Density | 0.900 | 0.904 | 0.926 |
| GPC of sample after reactor 2 | Number-average molecular weight | 38000 | 42800 | 39200 |
|  | Weight-average molecular weight | 152900 | 141600 | 153700 |
|  | Molecular weight distribution index | 4.02 | 3.31 | 3.92 |
| Final resin sample | MI | 0.99 | 0.98 | 0.70 |
|  | Density | 0.916 | 0.916 | 0.939 |
| GPC of final resin samlple | Number-average molecular weight | 26610 | 27900 | 39900 |
|  | Weight-average molecular weight | 114690 | 116060 | 158000 |
|  | Molecular weight distribution index | 4.31 | 4.16 | 3.96 |

Remarks

Ethylene feed ratio: the ratio of reactor 1:reactor 2:reactor 3;
Ti: means Ti in the single-site catalyst;
Al: indicates a co-catalyst triisobutylaluminum;
B: indicates a co-catalyst triphenylmethylium tetrakispentafluorophenylborate;
Ti+V: means a mixed catalyst (1:1 mass ratio) of titanium tetrachloride and vanadium trichlorooxide; and
Mg: means Mg in butylethly magnesium.

In Examples, the single-site catalyst was used in reactors 1 and 2, and the Ziegler-Natta catalyst was used in reactor 3, and in Comparative Examples 1 to 3, the single-site catalyst was used in reactor 2, and the Ziegler-Natta catalyst was used in reactor 3. In Comparative Examples 4 and 5, the single-site catalyst was used in reactors 1 and 2, and the Ziegler-Natta catalyst was used in reactor 3.

TABLE 3

Polymerization conditions in Comparative Examples 1 to 5 and physical properties of polymers according to the conditions

|  |  | Comparative Example 1 | Comparative Example 2 | Comparative Example 3 | Comparative Example 4 | Comparative Example 5 |
|---|---|---|---|---|---|---|
| Total solution flow rate (kg/h) |  | 6.5 | 6.5 | 6.5 | 6.5 | 6.5 |
| Ethylene feed ratio |  | 0:4:6 | 0:4:6 | 0:4:6 | 1:3:6 | 1:4:5 |
| Feed ratio between 1-octene and ethylene | Reactor 1 | — | — | — | 1.15 | 0.47 |
|  | Reactor 2 | 0.22 | 0.28 | 0.13 | 0.3 | 0.28 |
|  | Reactor 3 | 0.04 | 0.43 | 0.03 | 0.32 | 0.72 |
| Ti feed (μmol/kg) | Reactor 1 | — | — | — | 5 | 4.5 |
|  | Reactor 2 | 6.5 | 5.0 | 5.8 | 9 | 9 |
| Al/Ti ratio | Reactor 2 | 80 | 80 | 80 | 80 | 80 |
| B/Ti ratio | Reactor 2 | 3 | 3 | 3 | 3 | 3 |
| Ti + V feed (ppm) | Reactor 3 | 27 | 22 | 24 | 28 | 28 |
| Al/(Ti + V) ratio | Reactor 3 | 4.6 | 4.6 | 4.6 | 4.6 | 4.6 |
| Reaction temperature | Reactor 1 | — | — | — | 121 | 103 |
|  | Reactor 2 | 142 | 128 | 134 | 145 | 134 |
|  | Reactor 3 | 240 | 233 | 232 | 229 | 225 |
| Sample after reactor 1 | MI | — | — | — | 0.92 | 0.88 |
|  | Density | — | — | — | 0.872 | 0.905 |
| Sample after reactor 2 | MI | 0.50 | 0.22 | 0.31 | 2.12 | 1.78 |
|  | Density | 0.902 | 0.901 | 0.923 | 0.903 | 0.907 |
| Final resin sample | MI | 2.54 | 1.02 | 0.72 | 3.37 | 2.09 |
|  | Density | 0.918 | 0.916 | 0.938 | 0.917 | 0.916 |
| GPC of sample of final resin sample | Number-average molecular weight | 30650 | 25900 | 35470 | 24000 | 25300 |
|  | Weight-average molecular weight | 90420 | 101530 | 137620 | 84500 | 92300 |
|  | Molecular weight distribution index | 2.95 | 3.92 | 3.88 | 3.52 | 3.65 |

TABLE 4

Physical properties of films processed from polymers of Examples 1 to 5 and Comparative Examples 1, 2, 4 and 5

|  | Tensile strength (kg//cm$^2$) | Impact strength (g) | Haze (%) | Minimum heat seal temperature (° C.) | Processing load (Ampere) |
|---|---|---|---|---|---|
| Example 1 | 532 | 980 | 1.2 | 104 | 10.1 |
| Example 2 | 541 | 1050 | 1.4 | 103 | 9.9 |
| Example 3 | 548 | 1100 | 17 | 104 | 10.5 |
| Example 4 | 572 | 1170 | 17.3 | 102 | 10.3 |
| Example 5 | 545 | 1230 | 18 | 100 | 11.1 |
| Comparative Example 1 | 501 | 930 | 0.7 | 106 | 11.6 |
| Comparative Example 2 | 525 | 1050 | 17 | 108 | 11.6 |
| Comparative Example 4 | 336 | 254 | 1.4 | 103 | 9.5 |
| Comparative Example 5 | 483 | 359 | 16.4 | 106 | 10.2 |

TABLE 5

Results of comparative tests of Example 6 and Comparative Example 3

|  | Hoop stress | | Remarks |
|---|---|---|---|
|  | 5.0 MPa | 5.2 MPa |  |
| Example 6 | 1755 hrs | 778 hrs | Stretched and broken, 80° C. |
| Comparative Example 3 | 837 hrs | 132 hrs | Stretched and broken, 80° C. |

In Examples 1 and 2 and Comparative Example 1, polymer resins corresponding to the typical MI and density of cast films were synthesized according to the inventive method and the prior process, respectively, and the physical properties of the polymers and the films processed from the polymers were compared with each other. As can be seen in Tables 1 to 3, the polymers of Examples 1 and 2 showed a broader molecular weight distribution, because the polymers were produced through the three reactors. Also, as shown in Table 4, all the physical properties of the films processed from the polymers were improved, except that the haze of the films was slightly reduced. However, the difference in haze was not significant. Particularly, it can be seen that the processing load of the extruder was significantly reduced due to the broader molecular weight distribution, such that a reduction in energy consumption in a production process and an increase in production rate could be achieved. In Examples 1 and 2 and Comparative Example 4, polymer resins were synthesized through the same process using different metallocene catalysts, the polymers were analyzed, and the physical properties of the films processed from the polymers were compared with each other. The metallocene catalyst used in Comparative Example 4 was a catalyst not belonging to the range of metallocene catalysts disclosed in the present invention, and the copolymer produced through the first and second reactors using this catalyst did not provide high-molecular-weight resin at the corresponding reaction temperature. For this reason, the physical properties of produced resin were adjusted with the Ziegler-Natta catalyst in the third reactor in order to adjust the physical properties of the entire resin. As a result, the film thus manufactured showed a great difference from the resin of Example 1 with respect to physical properties. The comparison between Examples 3 to 5 and Comparative Example 2, conducted to confirm the improvement in the performance of blown films demonstrated the effect of the present invention. It can be seen that Examples 1 to 5 showed a significant improvement in physical properties with respect to impact strength and heat seal strength, when the molecular weight of the polymer produced in reactor 1 and the ratio of low-density moieties in the polymer were changed. In Example 3 and Comparative Example 5, polymer resins were synthesized using different metallocene catalysts through the same process, the polymers were analyzed, and the physical properties of the blown films processed from the polymers were compared with each other. The metallocene catalyst used in Comparative Example 5 was a catalyst not belonging to the range of the metallocene catalysts disclosed in the present invention, and the ethylene copolymer produced using this catalyst through the first and second reactors did not provide a high-molecular-weight, low-density resin at the corresponding reaction temperature. For this reason, the physical properties of the produced resin were adjusted with the Ziegler-Natta catalyst in the third reactor in order to adjust the physical properties of the entire resin. As a result, the film thus manufactured showed a great difference from the resin of Example 3 with respect to physical properties.

Example 6 is an example relating to the use of resin for pipe applications. In order to examine whether the physical properties of the produced resin are improved when the resin is used for pipe applications, the slow crack growth rate of a pipe processed from the resin was measured in accordance with ISO 13479 at a high temperature of 80° C. The polymer of Example 6 and the polymer of Comparative Example 3 were processed into pipes, each having an outer diameter of 16 mm and a thickness of 1.45 mm, and were applied with hoop stresses of 5.5 MPa and 5.65 MPa at 80° C., and the time until the breakdown of the pipes occurred was recorded. As can be seen in Table 5, the pipe manufactured from the polymer of Example 6, to which a high-molecular-weight, low-density moiety has been added in reactor 1, showed improved durability.

The invention claimed is:

1. A method for producing an ethylene copolymer having a multimodal molecular weight distribution, the method being carried out by a multistage solution polymerization using at least three polymerization reactors adiabatically operated under stirring, and comprising the steps of:

(a) polymerizing ethylene with at least one C4-C10 α-olefin in a first reactor using a metallocene catalyst represented by the following formula 1, which comprises a cyclopentadienyl group containing ligand around a transition metal and aryloxide ligand or ligands substituted with aryl derivatives at the ortho-positions, the ligands not being bridged, thus producing a first copolymer solution in which a polymer fraction has a density of 0.860-0.920 g/cm$^3$ and a melt index (MI) of 0.001-1.0 g/10 min.

(b) passing the first copolymer solution through a second reactor, which contains the same metallocene catalyst as used in step (a), ethylene and at least one C4-C10 α-olefin, at a temperature higher than the reaction temperature of step (a), thus producing a second copolymer solution in which a polymer fraction has a density of 0.900-0.940 g/cm$^3$ and a melt index (MI) of 0.1-10.0 g/10 min; and (c) passing the second copolymer solution through a third reactor, which contains a Ziegler-Natta catalyst different from the catalyst used in step (b), ethylene and at least one C4-C10 α-olefin, at a temperature higher than the reaction temperature of step (b), thus producing a third copolymer solution:

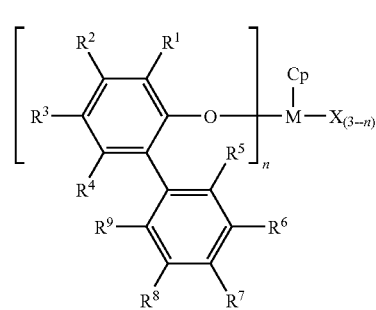

[Formula 1]

wherein M is a group-IV transition metal in the periodic table; Cp is cyclopentadienyl or a derivative thereof, which can form an η$^5$-bond with the central metal; $R^1$, $R^2$, $R^3$, $R^4$, $R^5$, $R^6$, $R^7$, $R^8$ and $R^9$ on the aryloxide ligands are each independently a hydrogen atom, a halogen atom, a C1-C20 linear or nonlinear alkyl group optionally substituted with at least one halogen atom, a silyl group containing a C1-C20 linear or nonlinear alkyl group optionally substituted with at least one halogen atom, a C6-C30 aryl group optionally substituted with at least one halogen atom, an C7-C30 arylalkyl group optionally substituted with at least one halogen atom, an alkoxy group having a C1-C20 linear or nonlinear alkyl group optionally substituted with at least one halogen atom, a siloxy group substituted with C3-C20 alkyl or C6-C20 aryl, an amido or phosphido group having a C1-C20 hydrocarbon group, or a mercapto or nitro group substituted with C1-C20 alkyl, wherein these substituents may also optionally bind to each other to form a ring; and X is selected from the group consisting of a halogen atom, a C1-C20 alkyl group other than a Cp derivative, a C7-C30 arylalkyl group, an alkoxy group having a C1-C20 alkyl group, a siloxy group substituted with C3-C20 alkyl, and an amido group having a C1-C20 hydrocarbon group; and n is an integer between 1 and 3.

2. The method of claim 1, wherein ethylene copolymer fractions obtained from the first copolymer solution, the second copolymer solution and the third copolymer solution are 2-20 wt %, 5-78 wt % and 20-75 wt %, respectively, based on the weight of the polymer obtained through steps (a)-(c).

3. The method of claim 1, wherein the first reactor is operated at a temperature of 70-190° C.

4. The method of claim 1, wherein the second reactor is operated at a temperature of 110-200° C.

5. The method of claim 1, wherein the third reactor is operated at a temperature of 170-300° C.

6. The method of claim 1, wherein the ethylene copolymer passed through the first and second reactors has a molecular weight distribution index of more than 3.

7. The method of claim 1, wherein the alpha-olefin which is a comonomer for ethylene in each of the steps is 1-butene, 1-pentene, 1-hexene, 4-methyl-1-pentene, 1-heptene, 1-octene or 1-decene.

* * * * *